March 18, 1930.  A. E. BURCH  1,751,392
APPLIANCE FOR VULCANIZING COVERS OF PNEUMATIC TIRES
Filed May 19, 1926

Inventor
A. E. Burch
by
Langner Parry Card & Langner Attys.

Patented Mar. 18, 1930

1,751,392

UNITED STATES PATENT OFFICE

ALFRED EDWARD BURCH, OF MELBOURNE, VICTORIA, AUSTRALIA

APPLIANCE FOR VULCANIZING COVERS OF PNEUMATIC TIRES

Application filed May 19, 1926, Serial No. 110,223, and in Australia June 10, 1925.

This invention relates to vulcanizing apparatus and more particularly to the retreading of worn pneumatic tires. It provides for a mould of the type known as a full circle and one in which the sides do not extend entirely over the walls of the cover or tire that is to receive the new tread, that is, a short sided mould.

One of the several objects of the invention is to provide a mould in which the walls of the cover to be retreaded shall not be subjected to serious strains and this will be provided for by supporting the inflatable air tube, that is used to press the tread into the matrix, on a floating rim within the cover.

A further object of the invention is to construct a tire treading mould in such a way that the matrix shall be in the larger part, that is to say, in the mould body. This will therefore comprise up to, say, two thirds of the transverse dimension of the mould with the door occupying the rest of the width.

It is also an objective of the invention to provide a matrix which can be slipped into or out of the mould according to the pattern of tread required.

Another object of the invention is the provision of means whereby the transverse width of the mould may be varied to receive various sized tires for retreading, as, for instance, the ordinary pneumatic tires or those of the balloon type.

Still another object of the invention is to provide for the air inflation tube a floating rim, the parts of which are hinged together and rendered partly collapsible to facilitate removal.

In the accompanying drawings—

Fig. 2 is an end view of the same and partly in section, while

The mould is made short sided, that is to say, its walls are not deep enough to extend entirely over the walls of the cover 4. This known practise has been found satisfactory as the vulcanizing process is confined principally to the tread of the cover to cure the new rubber tread, while the walls, which are comparatively weak, need not be retreated for their entire depth.

But it is further necessary, in the retreading of an old and worn cover, to avoid applying any strain to the walls, such as for instance, by inflating the tube 5 while the beads of the cover are held in a rim. The beads should be free and the cover free, when the pressure is applied through the tube 5 to come into the most intimate contact with the matrix. This is made possible by using the floating rim 6 that is of such a diameter, relatively to the cover 4, that when placed therein, there will be a sufficient space between the rim and the internal diameter of the cover to accommodate the air inflation tube.

Figure 1:
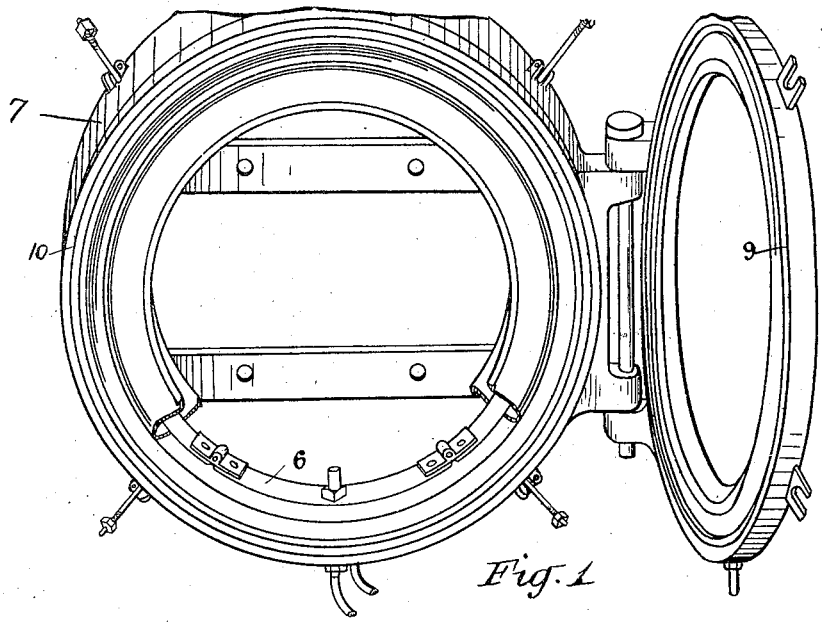
Fig. 1 is a perspective view of a retreading mould made in accordance with this invention and showing the various parts in position with the door open.
Figure 2:
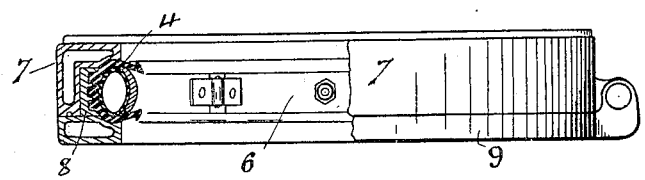

The rim 6 is made up of several sections or segments that are hingeably connected into an annulus that may be partially collapsed through the hinges. To facilitate this movement the joints between the parts at or near the hinges may be V shaped, as shown in Fig. 1.

The main part or body 7 of the mould contains the matrix 8 that is adapted to be slipped into and out of the mould and the door 9 is hinged to the main part as shown. The door, when opened, permits of the matrix 8 being placed in position in the mould thus allowing for the use in the same mould of matrices of varying patterns.

Figure 3:
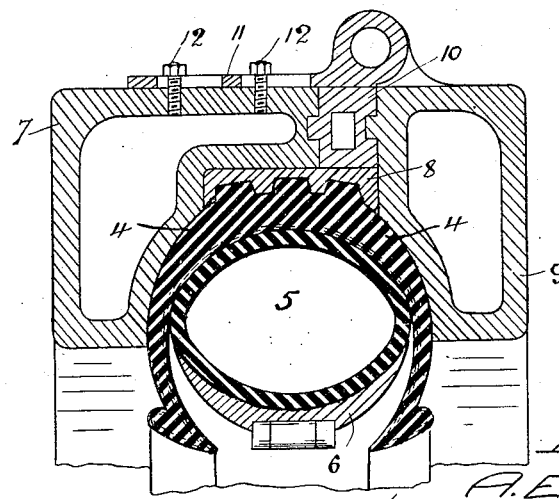
Fig. 3 is a transverse sectional elevation of the mould.

To adapt the mould to receive tires of different widths such as the ordinary tire cover or those made for balloon tires, the slip in matrix is formed to provide the necessary design for the full width and then, when a broader cover is to be treated in the mould, the main body part 7 is packed out flush with the matrix by a liner 10 against which and the cover the door 9 closes. The liner 10 is shown in Figs. 1 and 3 of the accompanying drawings.

To render the door operable when the liner is in place the plate 11 of the door hinge that is attached to the body 7 is slotted and adjustable and is held by the screws 12. The main part, liner and door are made hollow and are fitted with the usual steam connections for application of heat to the cover during the process of vulcanization.

In practice, the door 9 being open and the necessary matrix 8 slipped into place, the floating rim 6 along with the tube 5 is placed in the cover to be retreaded. The whole is then placed in the mould and the door closed. Air is now supplied to the tube 5 to the requisite pressure and at the same time steam is turned on to the mould parts to heat same. The pressure of air will draw up the free sides of the cover to permit of the most intimate contact between the new tread and matrix and without any undue strain being placed on the sides or the beads thereof. If a broader cover is to be retreaded, the necessary liner 10 is placed in position after which the screws 12 are loosened and the door hinge plate slid outwards before closing the door.

After the vulcanizing process is completed the door is opened when it will be possible to withdraw the cover and parts complete, together with the matrix, in one operation. Or the floating rim 6 may be partially collapsed, removed from the cover with the now deflated tube 5 and the cover detached from the matrix. In either case, when the door is opened the actual tread on the cover is left undisturbed and complete.

Having now described my invention what I claim as new and desire to secure by Letters Patent is:—

In a retreading machine, a full annular mould divided in a plane transverse to its axis into two unequal parts, a removable annular matrix carried solely by said larger part of such width as to extend beyond the plane of the open end of said larger part, said smaller part constituting a door for said mould, means for adjustably securing said door to said larger part to position it in the plane of the extended end of said matrix, and a detachable liner filling the space between said larger part and said door when the latter is so positioned.

In testimony whereof I have signed my name to this specification.

ALFRED EDWARD BURCH.